No. 859,374. PATENTED JULY 9, 1907.
J. W. DICKINSON, Jr.
BALL BEARING.
APPLICATION FILED MAR. 14, 1906.
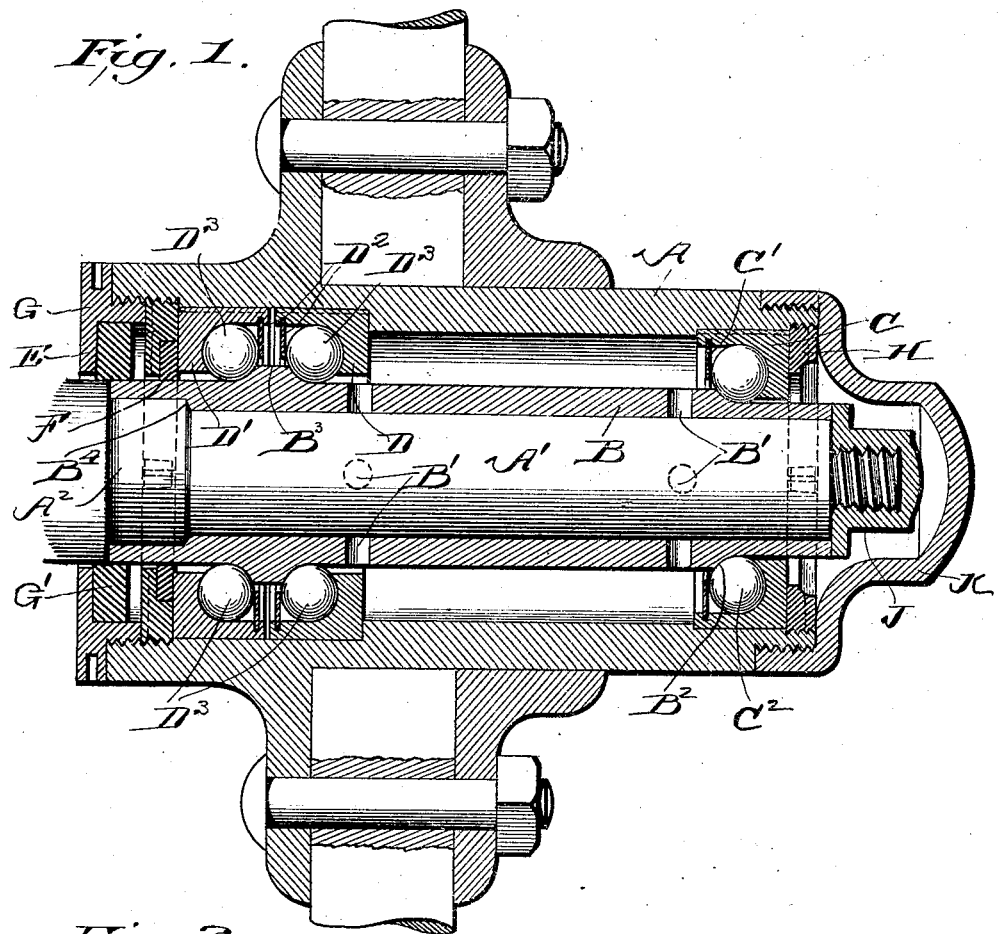
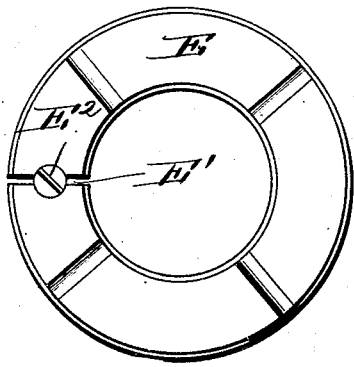
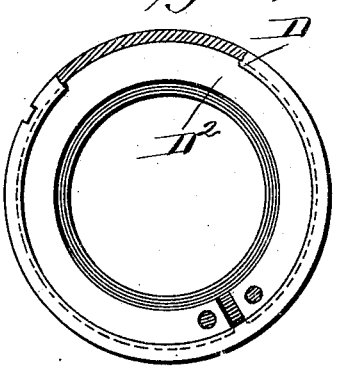
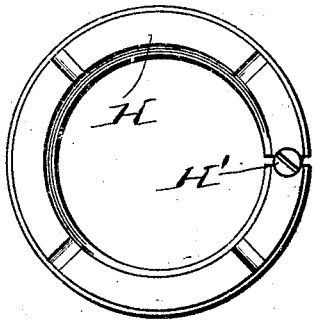
Witnesses
Inventor
J. W. Dickinson, Jr.
By O'Meara & Brock
Attorneys

UNITED STATES PATENT OFFICE.

JOHN WESLEY DICKINSON, JR., OF LITTLE ROCK, ARKANSAS.

BALL-BEARING.

No. 859,374.  Specification of Letters Patent.  Patented July 9, 1907.

Application filed March 14, 1906. Serial No. 305,979.

*To all whom it may concern:*

Be it known that I, JOHN WESLEY DICKINSON, Jr., a citizen of the United States, residing at Little Rock, in the county of Pulaski and State of Arkansas, have invented a new and useful Improvement in Ball-Bearings, of which the following is a specification.

This invention relates to a ball bearing which is especially adapted for heavy automobiles, electric trucks and gasolene delivery wagons where the main strain upon the bearing falls upon the shoulder of the rear axle for the reason that it is at this point is arranged the drive sprocket and the sprocket chain throws upon this particular part of the axle an unusual strain, especially with heavy or high speed machines using high power engines. This particular portion therefore requires special strengthening in order to insure safety. I therefore employ a specially constructed bearing with two ball cups provided at the rear end of the bearing in order to increase the bearing surface at the point mentioned.

The object of my bearing is not only to increase the resisting power against the strain put upon this point by the drive chain and sprocket wheel but a further object is to hold the rear wheel hub in perfect alinement at this point with the driving mechanism thereby doing away with any unnecessary wear or danger of accident by slipping of the sprocket chain.

The invention consists in the novel features of construction hereinafter described and claimed and shown in the accompanying drawings, in which:

Figure 1 is a longitudinal section through an automobile hub and my bearing in place therein. Fig. 2 is a detail face view of a rear lock nut. Fig. 3 is a detail face view of one of the ball cups. Fig. 4 is a detail face view of a front lock nut.

In these drawings A represents the hub of such a vehicle as has been mentioned, A' is a spindle, A² an axle, commonly a rear axle. My special bearing which I have shown applied to the parts just mentioned consists of a sleeve B which fits over the axle A' and which is provided with suitable lubricating bores B'. The sleeve B is reduced in exterior diameter adjacent its outer end thereby forming a shoulder B² said shoulder having a sloping face. Adjacent its rear end the sleeve B is provided with a circumferential shoulder B³ which upon its opposite faces is curved, and the sleeve B is also provided adjacent its rear end with an interior shoulder B⁴ which bears against the outer end of the axle A², the inner end portion of the sleeve B slightly overlapping and bearing upon a portion of the axle.

Upon the forward end of the sleeve B is slipped a ball cup C, which is provided with the usual retaining ring C' and with balls C which may or may not bear upon the shoulder B². The length of the sleeve B between the shoulder B² and its outer end is such that the balls C² will find a bearing surface at several points between said outer end and the shoulder B², which shoulder limits inward movement of the ball cup C along the sleeve B, and while it is preferable to slide the ball cup C far enough to allow the ball C² to rest upon said shoulder, it is not essential that the cup be slipped this far. Upon the rear portion of the sleeve B are placed two oppositely arranged ball cups D and D', these cups being arranged upon opposite sides of the shoulder B³. These ball cups are provided with retaining rings D² and with balls D³.

It will be obvious that the ball cup D which bears upon the outer face of the shoulder B³ is slipped into position upon the sleeve B before the ball cup C is placed in position.

To hold the various parts in position a lock nut E is threaded into the rear end portion of the hub A and bears upon the ball cup D'. This lock nut is recessed upon its inner face and a suitable washer F is fitted into said recess and bears upon the sleeve B and also upon the ball cup D'. The rear end of the hub is closed by a suitable dust cap G within which is fitted a suitable washer G'. At the front end of the hub a split lock nut H is threaded into the hub and bears upon the ball cup C. The sleeve B is held upon the spindle by the usual axle nut J and the entire front of the hub A is closed by a dust cap K which is threaded upon the hub.

By referring to Figs. 2 and 4, it will be noted that the lock nuts H and E differ in size only. The lock nut E is split at E' and a set screw E² works in said split portion and forces apart, when the set screw is screwed in, the two ends of the lock nut E, thereby slightly increasing the diameter of the lock nut and forcing its threads into binding engagement with the hub and locking it against any accidental displacement. The lock nut H is also locked in the same manner by a set screw H'.

It will be obvious from the above construction that the rear end portion of the hub A is very strongly supported and is provided with a large bearing surface to enable it to resist all pulling strains upon a sprocket wheel.

Having thus fully described my invention, what I claim and desire to secure by Letters Patent, is:—

A bearing of the kind described comprising a spindle, an axle, a sleeve fitting upon the spindle and fitting upon the end portion of the axle, said sleeve being reduced in exterior diameter adjacent its outer end, and provided with a circumferential shoulder adjacent its inner end, a ball cup arranged upon the reduced end portion, ball cups arranged upon the sleeve and on opposite sides of the shoulder, balls in the cups, and means for locking said cups in position.

JOHN WESLEY DICKINSON, JR.

Witnesses:
LEM KIRKPATRICK,
LILA ASHBY.